United States Patent [19]

Langen et al.

[11] Patent Number: 5,079,896
[45] Date of Patent: Jan. 14, 1992

[54] CARTON LOADING MACHINE

[75] Inventors: Marinus J. M. Langen, Rexdale; Peter Guttinger, Milton, both of Canada

[73] Assignee: H. J. Langen & Sons Inc., Mississauga, Canada

[21] Appl. No.: 616,817

[22] Filed: Nov. 19, 1990

Related U.S. Application Data

[60] Continuation of Ser. No. 417,717, Oct. 5, 1989, abandoned, which is a division of Ser. No. 356,512, May 25, 1989, abandoned.

[51] Int. Cl.⁵ .............................................. B65B 57/06
[52] U.S. Cl. .......................................... 53/54; 53/506; 53/579; 53/252
[58] Field of Search ............... 53/54, 67, 252, 258, 53/259, 505, 506, 543, 566, 579; 198/365, 372, 419.3, 580

[56] References Cited

U.S. PATENT DOCUMENTS

| | | | |
|---|---|---|---|
| 3,361,247 | 1/1968 | Lauzon et al. | 198/365 X |
| 3,509,681 | 5/1970 | Sass | 53/505 X |
| 3,592,000 | 7/1971 | Kapare | 53/543 X |
| 3,879,920 | 4/1975 | Langen | 53/506 |
| 4,250,693 | 2/1981 | Andersson | 53/543 |
| 4,553,659 | 11/1985 | Reim et al. | 53/252 X |
| 4,578,927 | 4/1986 | Scarpa et al. | 53/252 X |
| 4,817,779 | 4/1989 | Beck et al. | 198/372 X |

FOREIGN PATENT DOCUMENTS 1181618 11/1964 Fed. Rep. of Germany ........ 53/252

Primary Examiner—John Sipos
Attorney, Agent, or Firm—Fetherstonhaugh & Co.

[57] ABSTRACT

In a carton loading machine, there is provided a mechanism which will initially displace one row of cylindrical-shaped objects with respect to its adjacent row such that load items in one row are located in a staggered relationship with respect to the load items in the adjacent row. The load items are then displaced into the open end of a container. When the assembled load is substantially fully located within the container, the movement of one row is arrested while the movement of the other row continues until the items of the adjacent rows are arranged in a side-by-side relationship. This serves to permit the width of the accumulated load to be reduced until the load is substantially fully located in a carton and thereafter the load is rearranged to its maximum width to fit in a close fitting relationship within the carton. In addition, the carton loading machine has a load transporting conveyor which extends in a continuous path from a load accumulating station through a load separating station and load transfer station and back to the load accumulating station with the load supporting surface of the conveyor horizontally arranged so that it is capable of returning a load which is not displaced into a carton to the load accumulating station so that it can be recycled without the need to halt the operation of the machine.

1 Claim, 2 Drawing Sheets

CARTON LOADING MACHINE

This application is a continuation, of application Ser. No. 07/417,717, filed Oct. 5, 1989, now abandoned which is a division of application Ser. No. 07/356,512 filed May 25, 1989 now abandoned.

BACKGROUND OF THE INVENTION

This invention relates to carton loading machines.

Carton loading machines are commonly used to load a carton through an open end. In the known mechanisms, difficulty has been experienced in attempting to load cylindrical-shaped items such as cans or bottles through an open end of a carton without providing a substantial clearance between the load and the side walls of the carton. While a substantial clearance facilitates the loading of the carton, this same clearance is undesirable when the items are loaded into the carton because it permits the items to move within the carton when the carton is loaded and this is very undesirable. The freedom of movement within the carton can result in the containers colliding with one another to a sufficient extent to damage or break the container. Furthermore, this freedom of movement can be very dangerous when transporting a large load of cartons by means of a transport vehicle because it permits the load to shift relative to the vehicle.

A further difficulty which is experienced in carton-loading machines is that while a load may be correctly positioned for transfer into a carton, the carton may not be located in the carton confining compartment into which the load is to be transferred. In these circumstances, it is necessary to interrupt the operation of the carton loading machine in order to remove the load which cannot be accommodated. This interruption reduces the productivity because it create downtime.

SUMMARY OF THE INVENTION

It is an object of the present invention to provide a carton loading machine which will serve to stagger the load items prior to the loading of the load items into the open end of a carton to effectively reduce the width of load.

It is a further object of the present invention to provide a carton loading mechanism which will align staggered load items with one another after they have been loaded into an open carton so as to effectively increase the width of the assembled load to provide a close fitting relationship within the carton.

It is a further object of the present invention to provide a carton-loading machine in which the load transporting conveyor serves to return loads which are not transferred into a carton to the load assembly station so that the rejected loads can be reintroduced into the carton loading station.

According to one aspect of the present invention, there is provided in a loading machine for loading cylinderical shaped objects into a container which has a load accumulating compartment in which cylindrical-shaped load items are initially assembled in a first array in which at least two single file rows of load items are arranged with the load items of one row located in side-by-side alignment with respect to the load items of each adjacent row, each row of load items having a nesting recess located between each adjacent load item which extends laterally inwardly thereof, and a pusher member mounted for movement along the length of said compartment to push an accumulated load from said compartment through an open end of said compartment, the improvement wherein said pusher member comprises a pushing end which is directed toward the open end of the compartment, said pushing end having a pushing face for each row of load items, adjacent pushing faces comprising a first pushing face and a second pushing face, the first pushing face being spaced from the second pushing face in the direction of movement of the pushing member along the load confining compartment such that the first pushing face will make contact with a first of said rows of load items before the second pushing face makes contact with the adjacent second row thereby causing the load items of first row to be longitudinally displaced with respect to the load items of the second row such that the load items of the first row are aligned with the nesting recesses of the second row such that the assembled load may be free to assume a more compact array as it is discharged from the load confining compartment into a carton.

According to a further aspect of the present invention, there is provided in a carton loading machine of the type in which carton retaining compartments and load confining compartments are associated with one another and are simultaniously driven through a carton loading station in transverse alignment with one another on a carton conveyor and on a load transporting conveyor respectively, and wherein a pusher member is located in each load confining compartment for movement therealong between a retracted position and an extended position to drive a load from a load confining compartment into the carton retaining compartment with which it is associated and aligned, and wherein from time to time a carton is not located in a load receptive manner in a carton confining compartment which is aligned with a loaded load confining compartment into which a load should not be transferred during movement through the loading station, the improvement of carton detecting means for detecting the presence of a nonreceptive carton retaining compartment in said loading station, said carton detecting means communicating with the pusher means of the load confining compartment which is associated with the nonreceptive compartment to retain said pusher means in said retracted position such that the load which is aligned with the nonreceptive compartment is retained on the load transporting compartment and is transported out the load transfer station on the load transporting conveyor.

According to yet another aspect of the present invention there is provided a loading machine for loading cylindrical-shaped load items into a container comprising a load separating station in which a plurality of items are accumulated into orderly loading groups, a load transfer station in which each loading group is loaded into a carton, a load transporting conveyor having a forward run which is mounted for movement along a path of travel which extends into and through the load separating station and through the load transfer station, said load transporting conveyor having first and second side edges which extend longitudinally thereof, guide means dividing a first portion of the forward run of the load transporting conveyor into a plurality of longitudinally extending load guiding slipways which are arranged in a side-by-side relationship, each slipway having a discharge end opening into the load separating station along a discharge plane which is angularly inclined, with respect to the direction of movement of the forward run of the load transporting conveyor, from the first side edge to the second side edge of the load transporting conveyor whereby load items are successively released from the slipways at spaced points along the path of travel of the load transporting conveyor, a load transfer conveyor having a forward run which is arranged in a side-by-side relationship with respect to the first side edge of the load transporting conveyor and extends into and through the load separating station and through the load transfer station, a plurality of load divider members extending transversely of the load transfer conveyor, said load divider members being spaced from one another to form transversely extending load accumulating compartments therebetween, said load separating members being mounted on said load transfer conveyor for lateral movement between a first retracted position and a second extended position, each divider member having a leading end which is directed toward the load transfer conveyor, displacement means for moving the load divider members laterally with respect to the load transfer conveyor to cause the leading ends of the divider members to traverse the load transporting conveyor along a second inclined plane which extends parallel to and in close proximity to said discharge plane to separate load items which are located downstream of the leading end of the divider means from load items which are located upstream thereof to sequentially admit at least one load item from each slipway into each load accumulating compartment, load discharge means in each load accumulating compartment, said load discharge means being mounted for movement along its associated load accumulating compartment from the first edge of the load transporting conveyor to the second edge thereof during movement of the load accumulating compartment through the load transfer station to discharge an accumulated load from each load accumulating compartment.

BRIEF DESCRIPTION OF THE DRAWINGS

The invention will be more clearly understood after reference to the following detailed specification read in conjunction with the drawings wherein.

DESCRIPTION OF PREFERRED EMBODIMENTS

Figure 1:
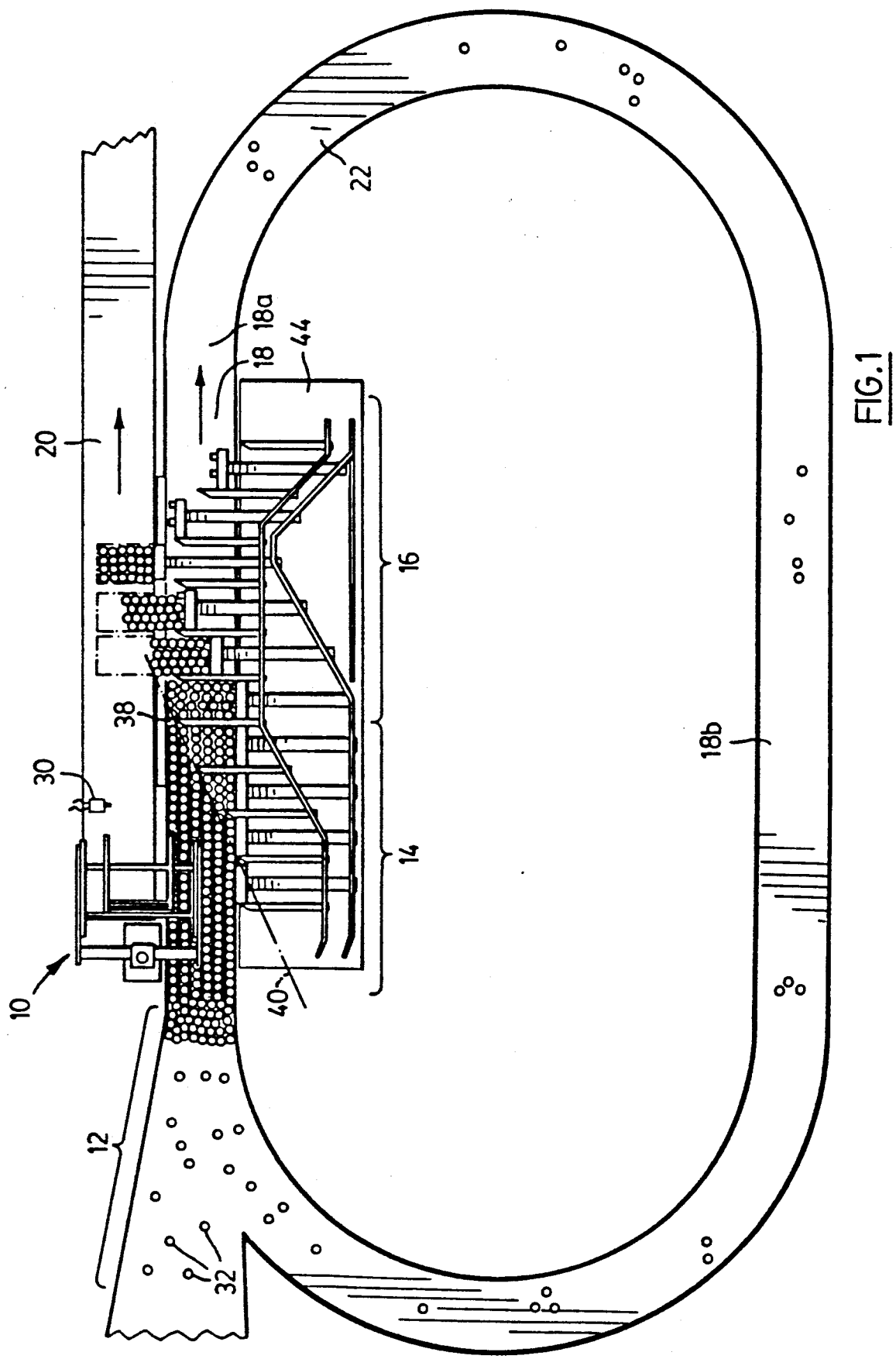
FIG. 1 is a diagrammatic plan view of a carton loading machine constructed in accordance with an embodiment of the present invention.

With reference to FIG. 1 of the drawings, the reference numeral 10 refers generally to a carton loading machine constructed in accordance with an embodiment of the present invention.

The carton loading machine has a load accumulating station 12, a load separating station 14 and a load transfer station 16. The carton loading machine 10 also has a load transporting conveyor 18 and a carton transporting conveyor 20. The load transporting conveyor 18 has a forward run portion 18a which extends in a side-by-side relationship with respect to the carton conveyor 20. The load transporting conveyor 18 also has a return run section 18b which extends between opposite ends of the forward run section 18a. It will be noted that the load supporting surface 22 of the load transporting conveyor 18 extends in a horizontal plane over its entire length with the result that it is capable of transporting a load in a continuous path which extends through the stations 12, 14 and 16 and back to the station 12.

Figure 2:
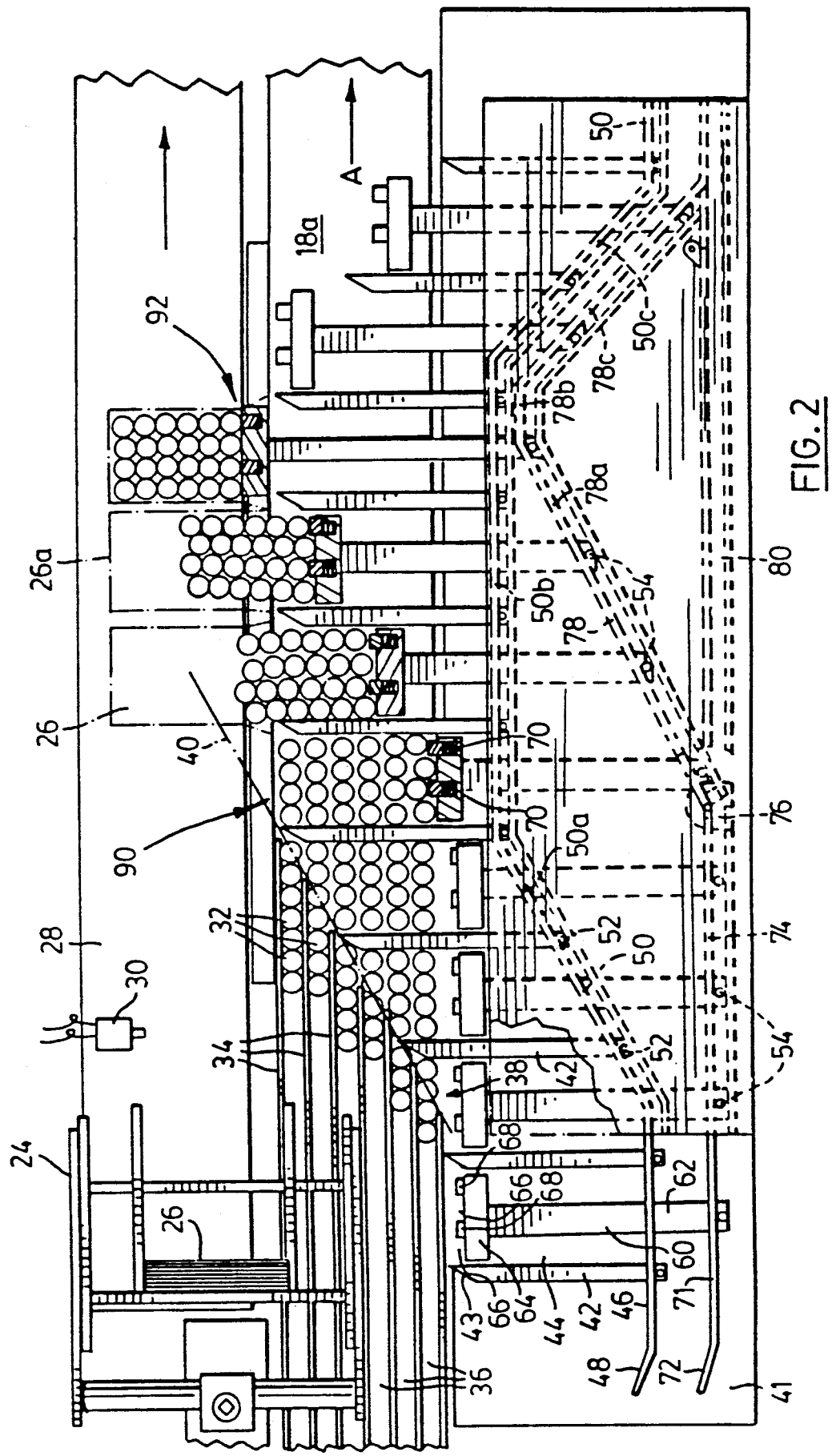
FIG. 2 is a plan view of the load separating station and load transfer station.

With reference to FIG. 2 of the drawings, it will be seen that a carton dispenser and opening mechanism which is generally identified by the reference numeral 24 is provided for the purposes of dispensing a knockdown carton 26 onto the conveyor 28 and simultaneously opening the carton. A sensor device 30 is provided which serves to determine whether or not a carton has been opened and correctly positioned on the conveyor 28 so as to be receptive to a load.

Carton dispenser mechanisms such as the dispenser mechanism 24 are well known as is the carton conveyor 28 and will not therefore be described in detail.

The load items 32 each have a cylindrical body portion and may be in the form of a bottle, jar or can or the like. A plurality of guide rails 34 are arranged in a spaced parallel relationship and extend along the portion of the forward run of the conveyor which extends into the load separating station 14. Slipways 36 are formed between adjacent pairs of guide rails. The slipways 36 extend in a side-by-side parallel relationship and each has a discharge end 38 which opens into the load separating station 14 along a discharge plane 40 which is angularly inclined with respect to the direction of forward movement A of the forward run 18a.

A plurality of load divider members 42 are each mounted for movement on a third conveyor 41 for movement through the load separating station 14 and load transfer station 16. The load divider blades 42 extend in a spaced parallel relationship and cooperate with one another to form load accumulating compartments 44 therebetween. The load divider blades 42 are mounted to reciprocate to and fro across the load transfer conveyor as they are driven by the conveyor 41 through the load separating and transfer stations 14 and 16. The displacement mechanism which is used for displacing the divider members 42 includes a first guide track 46 which has an angled lead-in portion 48 which serves to insure that the blades are withdrawn. A guide track 50 extends from the guide rail 46 and has a first portion of its length 52a which is angularly inclined so that it extends in a spaced parallel relationship with respect to the discharge plane 40. The guide track 50 has a second portion of its length 50b which extends parallel to the direction of forward movement of the load transfer conveyor and a third portion of its length 50c which is angularly inclined forwardly and laterally away from the load transporting conveyor. Each of the divider blades 42 has an angularly inclined face 43 at its outer end so that it presents a narrow leading edge to the load separating station.

A pusher assembly 60 is provided for each load accumulating compartment. The pusher assembly 60 includes an arm 62 and a pusher head 64. The pusher head 64 has fixed pushing faces 66 and movable pushing faces 68 which are arranged in a side-by-side relationship. Compression springs 70 serve to normally urge the movable pushing faces 68 to the extended position. The movable pushing faces 68 are movable between an extended position in which they are spaced forwardly from the fixed pushing faces 66 and a retracted position in which they are coplannar with the fixed pushing faces 66.

The pusher arms 62 are each mounted on the conveyor 44 for movement to the stations 14 and 16 and for movement along their associated load confining compartment between a retracted position and an extended position as shown in FIG. 2 of the drawings. The guide track assembly which serves to guide the movement of the pusher assembly 60 includes a guide rail 71 which has a lead-in portion 72 which serves to ensure that the pusher is correctly withdrawn before it enters the load separating station. A guide track 74 extends from the guide rail 71 to a diverter mechanism 76 from which branch lines 78 and 80 extend. The branch line 78 has an angularly inclined portion 78a, a short longitudinally extending portion 78b and a second angularly inclined portion 78c. The second angularly inclined portion 78c merges with the branch line 80.

In use, items such as bottles or cans enter the load accumulating station from a bottling or canning machine and are driven by the load transporting conveyor 18 into the slipways 36 to be arranged in an orderly single file configuration. As the load divider members and pusher assembly is driven through the load separating and load transfer stations 14 and 16, the follower 52 of each load divider member 42 will initially be driven along the angularly inclined section 50a of the guide track 50 such that the arrow leading end thereof is directed along the angularly inclined discharge plane 40 and passes across the discharge end 38 of each slipway 36 so that it will separate the load items which are located on either side of the discharge plane 40 to accumulate a load of items within the load accumulating compartment 44 located between adjacent divider members 42.

Simultaneously, the carton dispenser and opening mechanism 24 is activated in an attempt to provide an open carton on the conveyor 28 in alignment with each load accumulating compartment. The sensor 30 serves to determine whether or not the carton dispenser mechanism has been successful. If the sensor 30 determines that an open carton is not correctly located in alignment with a particular load accumulating station, the diverter mechanism 76 will be activated to ensure that the follower 54 of the pusher arm 62 which is aligned with the nonreceptive carton confining compartment of the conveyor 28 is guided along the branch line 80 such that the load associated therewith remains on the load supporting surface 22 of the conveyor 18 and is returned to the load accumulating station 12. It will be apparent that because the accumulated load which is not required remains on the load transporting conveyor and is returned by the load transporting conveyor to the load accumulating station, it is not necessary to interrupt the carton loading operation in circumstances where a carton is not operably positioned to receive an accumulated load.

When the sensor 30 determines that a carton is operably located in alignment with a load accumulating compartment, the diverter mechanism 76 is activated to cause the follower 54 of the associated pusher arm to travel along the branch line 78. The initial movement along the angularly inclined portion 78a will result in the movable pusher faces 68 moving forward into engagement with the column of load items with which they are aligned as shown at 90 in FIG. 2. As a result, the load items of the first row will be longitudinally displaced with respect to the load items of the second row such that the load items of the first row are aligned with the nesting recesses of the load items of the second row. Continued movment of the follower 54 along the inclined track 78 drives the accumulated load into the open end of a carton 26. Because the load items of one row are aligned with the nesting recesses of the load items of the adjacent row, it is possible to reduce the width of the assembled load as the load items are driven into the open end of the carton simply by contact between the load items in the side walls of the carton. The load items will continued to be driven into the carton in this staggered array until the follower 54 approaches the longitudinally extending portion 78b of the branch line 78. As the follower 54 approaches the section 78b, the load items which were previously displaced by the movable pushing faces 68 will contact the back wall 26a of the carton into which they have been loaded such that their forward movement will be arrested. The pusher arm 62 will, however, continue to move toward the back wall 26a of the container. As a result, the compression springs 70 will be compressed until the movable pushing faces 68 and the fixed pushing faces 66 are aligned with one another as shown at 92. The movement of the fixed pushing faces 66 into alignment with the movable pushing faces causes the load items in the adjacent columns to be rearranged in a side-by-side aligned relationship with the result that the width of the accumulated load is increased. This increase in the width of the accumulated load will serve to cause the load to fit in a close-fitting relationship within the carton into which it is loaded.

Continued movement of the pusher members and the load divider members causes both to be driven along the angularly inclined portions 78c and 50c of their guide tracks such that they are withdrawn and returned to their retracted position. The conveyor 41 serves to return the pusher assembly and the load divider members to the load separating station to repeat the process on a continuous basis.

From the foregoing, it will be apparent that the present invention provides a carton loading machine which is capable of high-speed operation when loading cylindrical-shaped objects into an open end of a carton. The machine makes allowance for the recycling of a load which is not displaced from the carton transporting conveyor when a carton is not operably located in alignment with its load accumulating compartment. In addition, the pusher mechanism which is used to displace the load into the carton is designed to arrange the load so that it may have a reduced width until the load is substantially fully located within the carton at which time the load items are displaced relative to one another to maximize the width of the load.

We claim:

1. In a carton loading machine of the type in which carton retaining compartments and load confining compartments are associated with one another and are simultaneously driven through a carton loading station in transverse alignment with one another on a carton conveyor and on a load transporting conveyor respectively, and wherein a pusher member is located in each load confining compartment for movement therealong between a retracted position and an extended position to drive a load from a load confining compartment into the carton retaining compartment with which it is associated and aligned, and wherein from time to time a carton is not located in a load receptive manner in a carton confining compartment which is aligned with a loaded load confining compartment thereby creating a nonreceptive carton confining compartment into which a load should not be transferred during movement through the loading station, the improvement of;

(a) carton detecting means for detecting the presence of a nonreceptive carton retaining compartment in said loading station, said carton detecting means communicating with the pusher means of the load confining compartment which is associated with the nonreceptive compartment to retain said pusher means in said retracted position such that the load which is aligned with the nonreceptive compartment is retained on the load transporting compartment and is transported out the load transfer station on the load transporting conveyor, (b) a load accumulating station located in advance of the carton loading station and (c) said load transporting conveyor having a forward run portion that extends from the load accumulating station to the carton loading station in a generally horizontal plane and a return run portion which extends from the carton loading station to the load accumulating station in said generally horizontal plane whereby said load transporting conveyor is capable of transporting a load from the load accumulating station to the loading station and returning a load from the loading station to the load accumulating station to permit reintroduction of loads into the load accumulating station.

* * * * *